US012753293B2

(12) United States Patent
Imanishi et al.

(10) Patent No.: US 12,753,293 B2
(45) Date of Patent: Oct. 6, 2026

(54) CELLULOSE COMPOSITE RESIN AND METHOD FOR THE PRODUCTION THEREOF

(71) Applicant: Panasonic Holdings Corporation, Osaka (JP)

(72) Inventors: Masayoshi Imanishi, Fukui (JP); Toshifumi Nagino, Osaka (JP); Masashi Hamabe, Osaka (JP); Shouma Nishino, Fukui (JP)

(73) Assignee: PANASONIC HOLDINGS CORPORATION, Osaka (JP)

(*) Notice: Subject to any disclaimer, the term of this patent is extended or adjusted under 35 U.S.C. 154(b) by 136 days.

(21) Appl. No.: 18/761,780

(22) Filed: Jul. 2, 2024

(65) Prior Publication Data

US 2024/0352232 A1 Oct. 24, 2024

Related U.S. Application Data

(62) Division of application No. 16/545,182, filed on Aug. 20, 2019, now Pat. No. 12,054,601.

(30) Foreign Application Priority Data

Aug. 24, 2018 (JP) ................................ 2018-157637
May 31, 2019 (JP) ................................ 2019-102327

(51) Int. Cl.
*C08L 1/02* (2006.01)
*C08K 7/02* (2006.01)
*C08L 21/00* (2006.01)

(52) U.S. Cl.
CPC ................ *C08L 1/02* (2013.01); *C08L 21/00* (2013.01); *C08K 7/02* (2013.01)

(58) Field of Classification Search
None
See application file for complete search history.

(56) References Cited

U.S. PATENT DOCUMENTS

| | | | |
|---|---|---|---|
| 6,284,098 | B1 | 9/2001 | Jacobsen |
| 10,040,926 | B2 | 8/2018 | Akai et al. |
| 2010/0190891 | A1 | 7/2010 | Eichinger et al. |
| 2016/0063984 | A1 | 3/2016 | Kosonen et al. |
| 2016/0376430 | A1 | 12/2016 | Kusumoto et al. |
| 2017/0313858 | A1 | 11/2017 | Tanaka et al. |
| 2017/0334105 | A1 | 11/2017 | Mikami et al. |

(Continued)

FOREIGN PATENT DOCUMENTS

| | | |
|---|---|---|
| CN | 107400289 | 11/2017 |
| EP | 0 922 729 | 6/1999 |
| EP | 1 580 231 | 9/2005 |

(Continued)

OTHER PUBLICATIONS

JP-2011231237-A, 2011, machine translation (Year: 2011).*

(Continued)

*Primary Examiner* — Satya B Sastri
(74) *Attorney, Agent, or Firm* — Wenderoth, Lind & Ponack, L.L.P.

(57) ABSTRACT

A cellulose composite resin includes a base resin, a cellulose fiber, a dispersing agent, and a rubber-containing polymer, and an α-cellulose content in the cellulose fiber is 50% by mass or more and less than 80% by mass.

9 Claims, 3 Drawing Sheets

(56) References Cited

U.S. PATENT DOCUMENTS

| | | | |
|---|---|---|---|
| 2018/0201770 | A1 | 7/2018 | Hamabe et al. |

FOREIGN PATENT DOCUMENTS

| | | | | |
|---|---|---|---|---|
| EP | 1 990 362 | | | 11/2008 |
| EP | 2 599 914 | | | 6/2013 |
| EP | 3 020 760 | | | 5/2016 |
| EP | 3 251 813 | | | 12/2017 |
| JP | 2005200614 | A | * | 7/2005 |
| JP | 2011-231237 | | | 11/2011 |
| JP | 2011231237 | A | * | 11/2011 |
| JP | 2016-79311 | | | 5/2016 |
| JP | 2016-94516 | | | 5/2016 |
| JP | 2017-210595 | | | 11/2017 |
| JP | 2018-104860 | | | 7/2018 |

OTHER PUBLICATIONS

JP 2005200614 A, machine translation, 2005 (Year: 2005).*

Extended European Search Report issued Jan. 23, 2020 in corresponding European Patent Application No. 19193407.4.

Office Action issued Oct. 8, 2022 in Chinese Patent Application No. 201910771275.8, with English-language translation.

Notification of Reasons for Refusal issued Feb. 7, 2023 in corresponding Japanese Patent Application No. 2019-102327, with English translation.

Alireza Ashori and Zaker Bahreini, "Evaluation of *Calotropis gigantea* as a Promising Raw Material for Fiber-reinforced Composite", Journal of Composite Materials, 2009, vol. 43, Issue 11, p. 1297-1304.

Second Office Action issued Mar. 4, 2023 in corresponding Chinese patent application No. 201910771275.8, with English translation.

EP-2599914-A 1, Jun. 2013, machine translation (Year: 2013).

JP-2018104860-A, Jul. 2018, Machine translation (Year: 2018).

Cellulose, Yano et al., (2018) 25:3351-3362 (Year: 2018).

(EP 1580231 A 1, Machine translation (Year: 2005).

Ashori et al., J. Composite Materials, 2009, vol. 43, No. 11, pp. 1297-1304 (Year: 2009).

* cited by examiner

Fig. 3

| | Material Conditions | | | | | Process Conditions | Evaluation Items | | | | | | |
|---|---|---|---|---|---|---|---|---|---|---|---|---|---|
| | α-cellulose Content (mass%) | Weight Ratio | | | | | | | | | | | |
| | | Amount of Base Resin | Amount of Cellulose Fiber | Amount of Dispersing Agent | Amount of Rubber-containing Polymer | Order of Feeding Materials | Specific surface area | Elastic Modulus | Falling Impact Test | L value | Degree of Crystallization | Number of Aggregates | Molecular Weight |
| Example 1 | 75 | 72 | 15 | 5 | 8 | Simultaneous | good | good | good | good | good | good | good |
| Example 2 | 75 | 65.5 | 20 | 6.5 | 8 | Simultaneous | good | good | good | good | good | good | good |
| Example 3 | 75 | 70 | 15 | 7 | 8 | Simultaneous | good | good | good | good | good | good | good |
| Example 4 | 75 | 68 | 15 | 5 | 12 | Simultaneous | good | good | good | good | good | good | good |
| Example 5 | 75 | 72 | 15 | 5 | 8 | Sequential | good | good | good | good | good | good | good |
| Comparative Example 1 | 30 | 72 | 15 | 5 | 8 | Simultaneous | good | normal | good | no-good | good | good | good |
| Comparative Example 2 | 90 | 72 | 15 | 5 | 8 | Simultaneous | good | good | no-good | good | no-good | good | good |
| Comparative Example 3 | 75 | 90.5 | 1 | 0.5 | 8 | Simultaneous | normal | no-good | good | good | good | good | good |
| Comparative Example 4 | 75 | 22 | 60 | 10 | 8 | Simultaneous | good | good | no-good | good | no-good | good | no-good |
| Comparative Example 5 | 75 | 76.99 | 15 | 0.01 | 8 | Simultaneous | good | normal | no-good | good | good | no-good | good |
| Comparative Example 6 | 75 | 47 | 15 | 30 | 8 | Simultaneous | good | no-good | good | good | good | good | good |
| Comparative Example 7 | 75 | 79.5 | 15 | 5 | 0.5 | Simultaneous | good | good | no-good | good | good | good | good |
| Comparative Example 8 | 75 | 50 | 15 | 5 | 30 | Simultaneous | good | no-good | good | good | good | good | good |

CELLULOSE COMPOSITE RESIN AND METHOD FOR THE PRODUCTION THEREOF

CROSS-REFERENCE TO RELATED APPLICATIONS

This application is a divisional application of U.S. patent application Ser. No. 16/545,182, filed Aug. 20, 2019, and claims priority of Japanese Patent Application No. 2018-157637 filed on Aug. 24, 2018 and Japanese Patent Application No. 2019-102327 filed on May 31, 2019, the contents of which is incorporated herein by reference.

BACKGROUND OF THE INVENTION

1. Field of the Invention

The present disclosure relates to a cellulose composite resin and a method for the production thereof.

2. Description of the Related Art

So-called "general purpose plastics" such as polyethylene (PE), polypropylene (PP), polystyrene (PS), and polyvinyl chloride (PVC) are characteristic in being relatively inexpensive, being as light in weight as a fraction of the weight of metal or ceramic, and additionally being easy in molding, etc. Accordingly, general purpose plastics are in use as materials for various living goods such as bags, various packaged bodies, various containers, and sheets; industrial components such as automotive parts and electrical components; and daily commodities, and miscellaneous goods.

However, general purpose plastics have drawbacks such as insufficient mechanical strength. Therefore, general purpose plastics have no sufficient properties required for the materials used for various industrial products including mechanical products such as automobiles, and electric/electronic/information products, and as affairs now stand, the application scopes of general purpose plastics are limited.

On the other hand, so-called "engineering plastics" such as polyacetal (POM), polyamide (PA), polycarbonate (PC), and fluororesin are superior in mechanical properties, and are used for various industrial products including mechanical products such as automobiles, and electric/electronic/information products. However, engineering plastics are expensive, have difficulty in monomer recycling, and have problems such as high environmental impact.

Hence, there is a demand for drastic improvement of general purpose plastics in material properties such as mechanical strength. As a method for improving the material properties of general-purpose plastics, there is known a technique of mixing two or more types of resins or additives such as fillers to produce a composite resin. In particular, in order to improve mechanical strength, natural fibers, glass fibers, carbon fibers, or the like, which are fibrous fillers, are used. Among them, organic fibrous fillers such as cellulose are attracting attention in recent years as reinforcing fibers because they are inexpensive and superior in environmental properties at the time of disposal.

As one of applications of a composite resin, it is used for appearance parts such as consumer electronics casings, and interior and exterior parts of automobiles. Properties required for appearance parts include, in addition to mechanical strength such as rigidity and impact strength, being capable of being colored in a desired color. For coloring in a desired color, the material is suitably transparent or in a color near white. Therefore, for coloring, a material having a large L value (brightness index value), which represents brightness, is desirable. However, since cellulose fibers are characterized by coloring (decreasing in L value) by heating at the time of the production thereof, cellulose composite resins have also been colored (decreased in L value). Therefore, when coloring a cellulose composite resin, there is a problem that it is difficult to color it into a desired color due to the color owned by the composite resin. In JP-A-2011-231237, the coloring property of a composite resin is improved by using a cellulose fiber with an α-cellulose content of 80% by mass or more, and suppressing coloring (decreasing in L value) of a composite resin.

SUMMARY

However, in the cellulose composite resin described in JP-A-2011-231237, since a cellulose fiber containing α-cellulose with a high crystallinity (degree of crystallization) in a content of 80% by mass or more is used, the cellulose fiber effectively functions as a crystal nucleating agent and the crystallinity of the resin is increased. As a result, there is a problem that the impact strength reinforcing effect of the elastomer is not sufficiently exhibited and impact strength is reduced.

The present disclosure is intended to solve the above-mentioned conventional problems, and one non-limiting and exemplary embodiments provides a cellulose composite resin which has a high impact strength and in which coloring (decrease in L value) of the resin is suppressed such that no problem is caused in coloring into a desired color.

In one general aspect, the techniques disclosed here feature: a cellulose composite resin of the present disclosure includes: a base resin, a cellulose fiber, a dispersing agent, and a rubber-containing polymer, wherein an α-cellulose content in the cellulose fiber is 50% by mass or more and less than 80% by mass.

In a method for producing a cellulose composite resin, the method includes:

preparing a first mixture of a base resin, a cellulose fiber, and a dispersing agent, and adding a rubber-containing polymer to the first mixture and kneading a second mixture, wherein a time of preparing the first mixture is 0.1 times or more a time of adding the rubber-containing polymer and kneading the second mixture.

Since the cellulose composite resin according to the present disclosure contains a cellulose fiber having an α-cellulose content of 50% by mass or more and less than 80% by mass, the coloring of the cellulose composite resin can be suppressed and the increase in crystallinity of the resin can also be suppressed. Therefore, the cellulose composite resin has a high impact strength while suppressing its coloring, that is, decrease in L value.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF THE DRAWINGS

The present disclosure will become readily understood from the following description of non-limiting and exemplary embodiments thereof made with reference to the accompanying drawings, in which like parts are designated by like reference numeral and in which:

FIG. 3 is a table showing the conditions and the measurement results in examples 1 to 5 and comparative examples 1 to 8.

DETAILED DESCRIPTION

A cellulose composite resin according to a first aspect, includes a base resin, a cellulose fiber, a dispersing agent, and a rubber-containing polymer, wherein an α-cellulose content in the cellulose fiber is 50% by mass or more and less than 80% by mass.

Further, as a cellulose composite resin of a second aspect, in the first aspect, a content of the cellulose fiber is 5% by mass or more and 25% by mass or less where a total amount of the base resin, the cellulose fiber, the dispersing agent, and the rubber-containing polymer in the cellulose composite resin is 100% by mass.

Further, as a cellulose composite resin of a third aspect, in the first aspect or second aspect, a content of the dispersing agent is 0.1% by mass or more and 15% by mass or less where a total amount of the base resin, the cellulose fiber, the dispersing agent, and the rubber-containing polymer in the cellulose composite resin is 100% by mass.

Further, as a cellulose composite resin of a fourth aspect, in any one of the first aspect to third aspect, a content of the rubber-containing polymer is 1% by mass or more and 20% by mass or less where a total amount of the base resin, the cellulose fiber, the dispersing agent, and the rubber-containing polymer in the cellulose composite resin is 100% by mass.

Further, as a cellulose composite resin of a fifth aspect, in any one of the first aspect to fourth aspect, the rubber-containing polymer is a rubber-containing polymer that is composed of an aliphatic hydrocarbon or aromatic hydrocarbon having only a functional group composed of atoms having a Pauling's electronegativity of 2.7 or less and having a structure where a difference in electronegativity between adjacent atoms is 0.8 or less.

Further, as a cellulose composite resin of a sixth aspect, in any one of the first aspect to fifth aspect, further comprising a colorant.

Further, as a cellulose composite resin of a seventh aspect, in any one of the first aspect to sixth aspect, the base resin is an olefin-based resin.

A method for producing a cellulose composite resin according to an eighth aspect, the method includes:

preparing a first mixture of a base resin, a cellulose fiber, and a dispersing agent, and adding a rubber-containing polymer to the first mixture and kneading a second mixture, wherein a time of preparing the first mixture is 0.1 times or more a time of adding the rubber-containing polymer and kneading the second mixture.

Hereafter, the cellulose composite resin and the method for producing the same in embodiments of the present disclosure will be described with reference to the drawings. In the following description, the same constituents are denoted by the same reference signs, and the detailed description on such constituents is sometimes omitted on a case-by-case basis.

Embodiment 1

Figure 1:
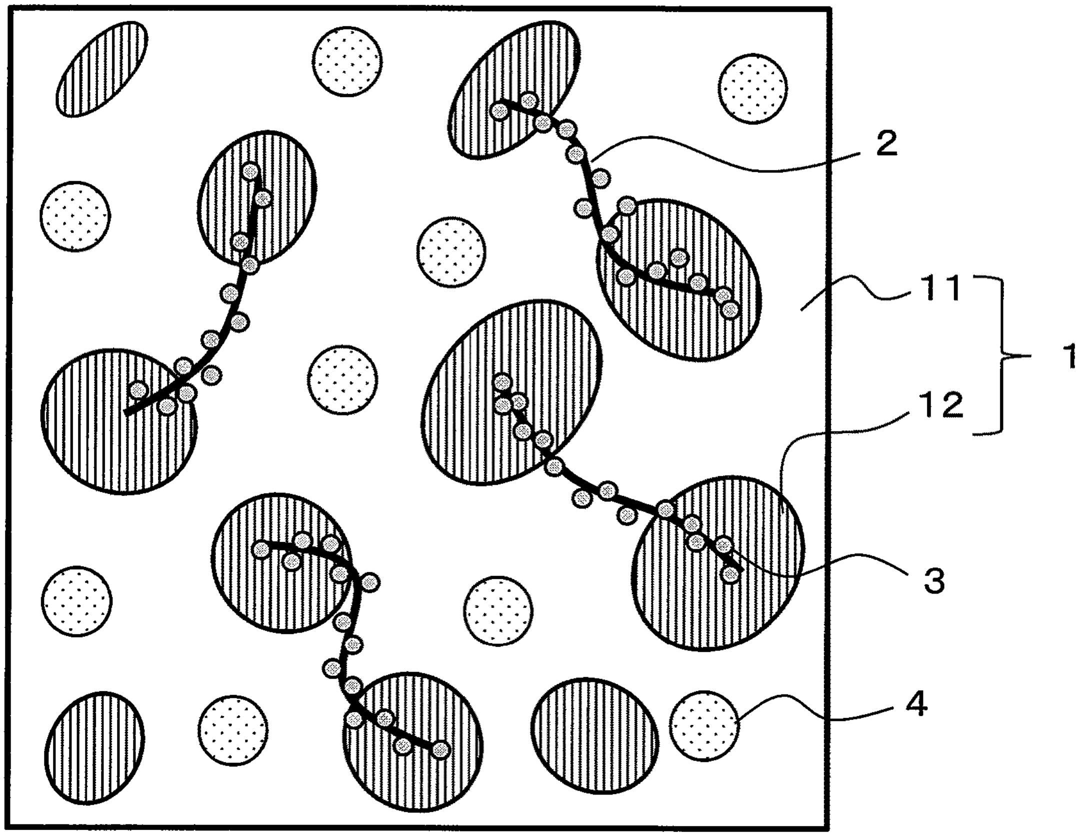
FIG. 1 is a schematic view of a cellulose composite resin in embodiment 1.

The cellulose composite resin in embodiment 1 includes a base resin 1 constituted of a matrix of a noncrystalline portion 11 and a crystalline portion 12, a cellulose fiber 2, a dispersing agent 3, and a rubber-containing polymer 4. In the cellulose composite resin, as shown in FIG. 1, the cellulose fiber 2, the dispersing agent 3, and the rubber-containing polymer 4 are dispersed in the matrix of the base resin, and the dispersing agent 3 is present at the interface between the cellulose fiber 2 and the base resin 1, and so on.

The base resin 1 in embodiment 1 is, for example, a thermoplastic resin in order to secure good moldability. Examples of the thermoplastic resin include: olefin-based resins (including cyclic olefin-based resins), styrene-based resins, (meth)acrylic resins, organic acid vinyl ester-based resins and the derivatives thereof, vinyl ether-based resins, halogen-containing resins, polycarbonate-based resins, polyester-based resins, polyamide-based resins, thermoplastic polyurethane resins, polysulfone-based resins (e.g., polyether sulfone and polysulfone), polyphenylene ether-based resins (e.g., a polymer of 2,6-xylenol), cellulose derivatives (e.g., cellulose esters, cellulose carbamates, and cellulose ethers), silicone resins (e.g., polydimethylsiloxane and polymethylphenylsiloxane), and rubbers or elastomers (e.g., diene-based rubbers such as polybutadiene and polyisoprene, styrene-butadiene copolymer, acrylonitrile-butadiene copolymer, acrylic rubber, urethane rubber, and silicone rubber). The above resins may be used each alone or in combinations of two or more thereof. The resin is not limited to the above materials as long as it has thermoplasticity.

Among these thermoplastic resins, the base resin is, for example, an olefin-based resin, which is relatively low in melting point. The olefin-based resins include, in addition to homopolymers of olefin-based monomers, copolymers of olefin-based monomers, and copolymers between olefin-based monomers and other copolymerizable monomers. Examples of the olefin-based monomer include: chain olefins (e.g., α-C2-20 olefins such as ethylene, propylene, 1-butene, isobutene, 1-pentene, 4-methyl-1-pentene, and 1-octene), and cyclic olefins. These olefin-based monomers may be used each alone or in combinations of two or more thereof. Among the aforementioned olefin-based monomers, chain olefins such as ethylene and propylene are desirable. Examples of the other copolymerizable monomers include: fatty acid vinyl esters such as vinyl acetate and vinyl propionate; (meth)acrylic monomers such as (meth)acrylic acid, alkyl (meth)acrylates, and glycidyl (meth)acrylate; unsaturated dicarboxylic acids and anhydrides thereof such as maleic acid, fumaric acid, and maleic anhydride; vinyl esters of carboxylic acids (e.g., vinyl acetate and vinyl propionate); cyclic olefins such as norbornene and cyclopentadiene; and dienes such as butadiene and isoprene. These copolymerizable monomers may be used each alone or in combinations of two or more thereof. Examples of the olefin-based resin include polyethylene (e.g., low-density, intermediate-density, high-density, or linear low-density polyethylene), polypropylene, ethylene-propylene copolymer, and chain olefins (especially, α-C2-4 olefins) such as terpolymers such as ethylene-propylene-butene-1.

Examples of the cellulose fiber 2 in embodiment 1 include cellulose fiber and lignocellulose fiber. Examples of the raw material of cellulose fiber and lignocellulose fiber include natural materials such as timber (coniferous trees and broad leaved trees), cotton linter, kenaf, Manila hemp (abacca), sisal hemp, jute, Savai grass, esparto grass, bagasse, rice plant straw, wheat straw, reed, and bamboo. Moreover, a cellulose fiber modified with an acid or a functional monomer containing an amine, an epoxy, or the like may be used.

Examples of the dispersing agent 3 in embodiment 1 include: various titanate-based coupling agents; silane coupling agents; modified polyolefins grafted with unsaturated carboxylic acids, maleic acid, maleic anhydride, or anhydride thereof; fatty acids; fatty acid metal salts; and fatty acid esters. The silane coupling agents are, for example, unsaturated hydrocarbon-based silane coupling agents or epoxy-based silane coupling agents. No problems are caused even if the surface of the dispersing agent is subjected to a modification treatment with a thermosetting or thermoplastic polymer component. The dispersing agent 3 is appropriately chosen depending on the combination of the base resin 1 and the cellulose fiber 2.

The rubber-containing polymer in embodiment 1 is, for example, a rubber-like substance such as a natural or synthetic polymer that is an elastic material at room temperature, and an elastic material also at 0° C. or less is more desirable. Specific examples thereof include ethylene-α-olefin copolymer rubbers such as ethylene-propylene rubber, ethylene-propylene-nonconjugated diene rubber, ethylene-butene-1 rubber, ethylene-butene-1-nonconjugated diene rubber, and ethylene-octene rubber; polybutadiene, styrene-butadiene block copolymer rubber, styrene-butadiene-styrene block copolymer rubber, styrene-butadiene copolymer rubber, partially hydrogenated styrene-butadiene-styrene block copolymer rubber, styrene-isoprene block copolymer rubber, partially hydrogenated styrene-isoprene block copolymer rubber, polyurethane rubber, styrene graft-ethylene-propylene-non-conjugated diene rubber, styrene-graft-ethylene-propylene rubber, styrene/acrylonitrile-graft-ethylene-propylene-nonconjugated diene rubber, styrene/acrylonitrile-graft-ethylene-propylene rubber, etc., or mixtures thereof. Moreover, a modified rubber modified with other acid or a functional monomer containing an amine, an epoxy, or the like may be used. A rubber-containing polymer that includes an aliphatic hydrocarbon or aromatic hydrocarbon having only a functional group composed of atoms having a Pauling's electronegativity of 2.7 or less and having a structure where a difference in electronegativity between adjacent atoms is 0.8 or less is more desirable.

From the viewpoint of suppression of coloring (decrease in L value) of the cellulose composite resin, the cellulose fiber to be used in embodiment 1 has, for example, an α-cellulose content of 50% by mass or more and less than 80% by mass, and an α-cellulose content of 60% by mass or more and less than 80% by mass is more desirable. As shown in FIG. 1, the cellulose composite resin of the present disclosure includes a base resin 1, a cellulose fiber 2, a dispersing agent 3, and a rubber-containing polymer 4. It has a structure in which the base resin 1 functions as a matrix and the cellulose fiber 2, the dispersing agent 3, and the rubber-containing polymer 4 are dispersed in the base resin 1. In the cellulose composite resin, the cellulose fiber 2 has an effect of improving the crystallinity of the base resin by functioning as a crystal nucleating agent in addition to the effect of improving the mechanical strength of the cellulose composite resin by a fiber reinforcing effect. The cellulose fiber 2 includes α-cellulose being high in crystallinity and heat stability and a component being low in crystallinity and heat stability as compared to α-cellulose. The higher the α-cellulose content, the more the crystallinity and the heat stability of the cellulose fiber are improved. Therefore, a cellulose composite resin containing a cellulose fiber having a high α-cellulose content is inhibited from being colored, that is, decreasing in L value. However, since the cellulose fiber 2 having a high α-cellulose content is high in crystallinity and has an enhanced crystal nucleating agent effect, impact strength decreases as a result of increase in the crystallinity of the base resin component. An elastomer can effectively absorb impact when it is present in a noncrystalline portion rather than a crystalline portion of the base resin from the impact absorption mechanism of the elastomer. Therefore, when the noncrystalline portion of the base resin decreases due to increase in crystallinity of the base resin, the effect of reinforcing the impact strength of the elastomer decreases.

Figure 2A:
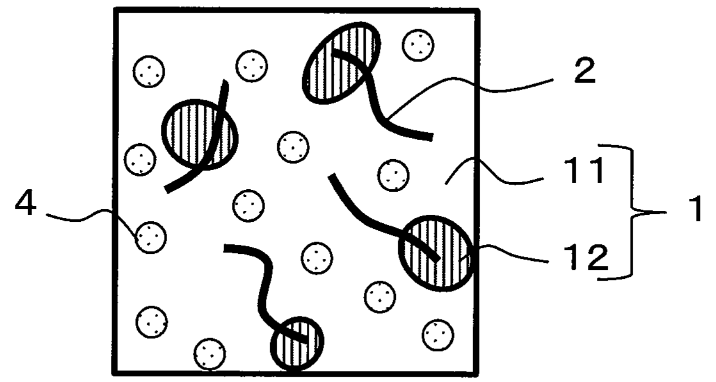
FIG. 2A is a schematic view showing a crystallized state in the case where the α-cellulose content of the cellulose composite resin in embodiment 1 is less than 50% by mass.
Figure 2B:
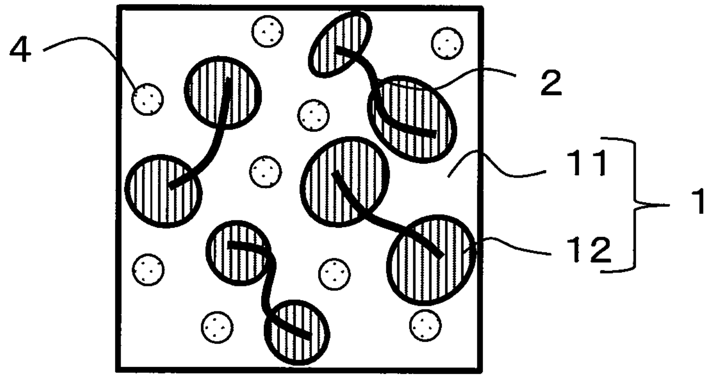
FIG. 2B is a schematic view showing a crystallization state in the case where the α-cellulose content of the cellulose composite resin in embodiment 1 is 50% by mass or more and less than 80% by mass.
Figure 2C:
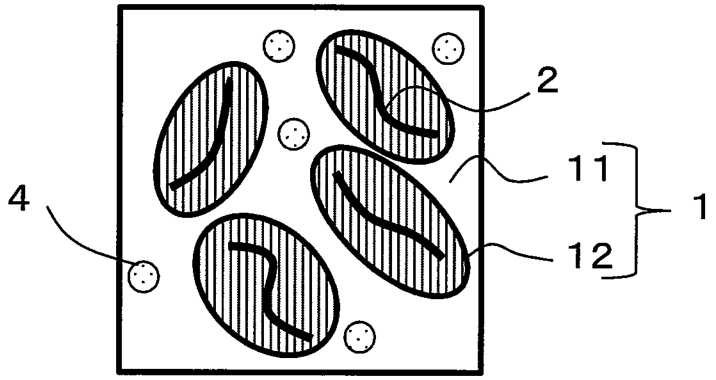
FIG. 2C is a schematic view showing a crystallized state in the case where the α-cellulose content of the cellulose composite resin in embodiment 1 is 80% by mass or more.

FIG. 2A, FIG. 2B, and FIG. 2C are schematic views each showing the change of the crystallization state depending on the α-cellulose content of the cellulose composite resin in embodiment 1. FIG. 2A is a schematic view showing a crystallization state in the case where the α-cellulose content in a cellulose fiber is less than 50% by mass. FIG. 2B is a schematic view showing a crystallization state in the case where the α-cellulose content in a cellulose fiber is 50% by mass or more and less than 80% by mass. FIG. 2C is a schematic view showing a crystallization state in the case where the α-cellulose content in a cellulose fiber is 80% by mass or more.

As shown in FIG. 2A, when the α-cellulose content in a cellulose fiber is less than 50% by mass, the impact strength is high, but the thermal stability of the cellulose fiber 2 is low, so that thermal decomposition proceeds during the production of the cellulose composite resin to cause coloring, that is, reduce the L value significantly, and reduce rigidity. When the α-cellulose content in the cellulose fiber is 80% by mass or more, the crystallinity of the base resin is increased, so that the impact strength decreases significantly as shown in FIG. 2C. In this case, coloring, that is, decrease in L value, is inhibited. Therefore, it is desirable that the α-cellulose content in a cellulose fiber in a cellulose composite resin be 50% by mass or more and less than 80% by mass as shown to FIG. 2B. In this case, the impact strength is high, and coloring, that is, decrease in L value, is inhibited.

The amount of the base resin, the cellulose fiber, the dispersing agent, and the rubber-containing polymer in the cellulose composite resin of embodiment 1 is 100% by mass in total.

The amount of the cellulose fiber in the cellulose composite resin of embodiment 1 is, for example, 5% by mass or more and 25% by mass or less. When the amount of the cellulose fiber is less than 5% by mass, the fiber reinforcing effect by the cellulose fiber is small, so that the rigidity is reduced. When the amount of the cellulose fiber is larger than 25% by mass, the total amount of α-cellulose is large and the nucleating agent effect is increased even if the α-cellulose content in the cellulose fibers is small, so that the impact strength is reduced. Therefore, the cellulose composite resin having the amount of the cellulose fiber within the above range is desirable.

The amount of the dispersing agent in the cellulose composite resin of embodiment 1 is, for example, 0.1% by mass or more and 15% by mass or less. The dispersing agent improves the compatibility by being present at the interface between the cellulose fiber and the base resin or the rubber-containing polymer. When the amount of the dispersing agent is less than 0.1% by mass, the dispersing agent is not present in a sufficient amount at the interface between the cellulose fiber and the base resin, so that the adhesion at the interface is poor and voids etc. are present in some portions, and the effect of improving the mechanical strength is hardly expressed. In addition, insufficient dispersion of the cellulose fiber will occur. When the amount of the dispersing agent is more than 15% by mass, the strength of the cellulose composite resin is lowered because of the excessive presence of the dispersing agent. Therefore, the cellulose composite resin having the amount of the dispersing agent within the above range is desirable.

The amount of the rubber-containing polymer in the cellulose composite resin of embodiment 1 is, for example, 1% by mass or more and 15% by mass or less. When the amount of the rubber-containing polymer is less than 1% by mass, the improvement in impact strength of the cellulose composite resin can hardly be expected because the amount of the rubber-containing polymer is excessively small. When the amount of the rubber-containing polymer is more than 15% by mass, the amount of the rubber-containing polymer is excessively large, leading to a problem that the rigidity is significantly reduced while the impact strength is greatly improved. In addition, when the amount of the rubber-containing polymer is extremely large, there is also a problem that the matrix is changed from the base resin to the rubber-containing polymer. Therefore, the cellulose composite resin having the amount of the rubber-containing polymer within the above range is desirable.

The rubber-containing polymer of embodiment 1 is, for example, a rubber-containing polymer that includes an aliphatic hydrocarbon or aromatic hydrocarbon having only a functional group composed of atoms having a Pauling's electronegativity of 2.7 or less and having a structure where a difference in electronegativity between adjacent atoms is 0.8 or less. In the case of a functional group that is composed of atoms including atoms having a Pauling's electronegativity of more than 2.7 and has a structure also including a portion where the difference in electronegativity between adjacent atoms exceeds 0.8, the functional group has a high polarity, so that a strong interaction occurs or a bond is formed with a hydroxyl group, which is a polar group, in cellulose. If a strong interaction or a bond is formed between the cellulose fiber and the rubber-containing polymer, the interface between the cellulose fiber and the base resin is reduced, so that the fiber reinforcing effect to the base resin is reduced. Therefore, it is more desirable that a rubber-containing polymer includes an aliphatic hydrocarbon or aromatic hydrocarbon having only a functional group composed of atoms having a Pauling's electronegativity of 2.7 or less and having a structure where a difference in electronegativity between adjacent atoms is 0.8 or less.

The cellulose composite resin of embodiment 1 may contain a colorant. Examples of the colorant include organic pigments, inorganic pigments, and dyes. The type, color and concentration of the colorant are appropriately chosen depending on the combination of application and material.

In the method for producing the cellulose composite resin of embodiment 1, the kneading time of the first mixture of the base resin, the cellulose fiber and the dispersing agent is, for example, 0.1 times or more as compared with the kneading time of the second mixture after the addition of the rubber-containing polymer. On the other hand, when the second mixture has been prepared by kneading the base resin, the cellulose fiber, the dispersing agent, and the rubber-containing polymer simultaneously, the viscosity of the second mixture is high because the viscosity of the rubber-containing polymer is higher than that of other materials. For this reason, the cellulose fiber and the dispersing agent cannot be uniformly dispersed in the resin matrix, so that the increasing rate of the mechanical strength of the cellulose composite resin is lowered. On the other hand, when only the base resin, the cellulose fiber, and the dispersing agent are mixed to form a first mixture and the kneading time of the first mixture is less than 0.1 times as compared with the kneading time of a second mixture after the addition of the rubber-containing polymer, the kneading time of the base resin, the cellulose fiber, and the dispersing agent become short. As a result, the short kneading time will cause a situation where the rubber-containing polymer is added to the first mixture in which the cellulose fiber and the dispersing agent have not yet been dispersed sufficiently, resulting in a state where those have not been dispersed also in the cellulose composite resin, so that the rate of increase in mechanical strength is lowered. Therefore, the kneading time of the first mixture is, for example, 0.1 times or more as compared with the kneading time of the second mixture after the addition of the rubber-containing polymer.

As a kneading apparatus to be used in the method for producing the cellulose composite resin of embodiment 1, a kneader, a Banbury mixer, an extruder, and a roll kneader are desirable. Among these, it is more desirable to use a twin-screw kneader and a roll kneader. The kneading apparatus is not limited to the above-described apparatus as long as it has a rotating body as a kneading means.

EXAMPLES

The conditions and the measurement results of examples 1 to 5 and comparative examples 1 to 8 are shown in FIG. 3.

Example 1

A cellulose composite resin was produced by the following production method. As described above, a kneader, a Banbury mixer, an extruder, a roll kneader, etc. can be used as the kneading apparatus, but in example 1 was used a twin-screw kneader.

A polypropylene (trade name: J108M, manufactured by Prime Polymer Co., Ltd.) as a base resin, a cellulose fiber with an α-cellulose content of 75% by mass obtained by pulverizing softwood pulp (trade name: NBKP Celgar, manufactured by Mitsubishi Paper Mills Limited) as a cellulose fiber, a maleic anhydride-modified polypropylene (trade name: UMEX, manufactured by Sanyo Chemical Industries, Ltd.) as a dispersing agent, and SEBS (trade name: Tuftec, manufactured by Asahi Kasei Corporation) as an elastomer were weighed to give a mass ratio of 72:15:5:8, and subjected to dry-blending.

The dry-blended raw material was fed to a kneading apparatus at 2 kg/h with a weight feeder. As described above, a twin-screw kneader (TEX30a, manufactured by The Japan Steel Works, Ltd. (JSW, Ltd.)) was used as the kneading apparatus. The screw had a specifications of intermediate shear type. The cellulose composite resin discharged from the twin-screw kneader was hot-cut to prepare a cellulose composite resin pellet.

By using the prepared cellulose composite resin pellets, a specimen of a cellulose composite resin molded article was prepared with an injection molding machine (180AD, manufactured by The Japan Steel Works, Ltd.). The preparation conditions of the specimen were adjusted to a base resin temperature of 190° C., a mold temperature of 60° C., an injection speed of 60 mm/s, and a dwell pressure of 80 Pa. While pellets are taken by the screw of the molding machine via the hopper, the entry of the pellets during such a process was measured based on the amount of reduction of the pellets per unit time and was confirmed to be constant. The shape of the specimen was varied depending on the following evaluation items. Specifically, a No. 1 size dumbbell was prepared for measurement of elastic modulus, and a 60-mm square plate having a thickness of 1.2 mm was prepared for a falling impact test. The specimen of the resulting cellulose composite resin molded article was evaluated by the following method.

<Evaluation Items of Cellulose Composite Resin Molded Article>

(Specific Surface Area of Fibrous Filler)

The obtained cellulose composite resin pellet was immersed in xylene solvent to dissolve polypropylene, and the remaining cellulose fiber was subjected to the measurement of the specific surface area thereof. The case where the specific surface area was less than 150% as compared to the raw material was evaluated as "no-good", the case where the specific surface area was 150% or more and less than 200% was evaluated as "normal", and the case where the specific surface area was 200% or more was evaluated as "good". The specific surface area of the cellulose fiber was 220%, and the evaluation thereof was "good".

(Elastic Modulus of Cellulose Composite Resin Molded Article)

A tensile test was performed using the obtained specimen with a No. 1 dumbbell shape. The evaluation method of elastic modulus was such that the case where the value of the elastic modulus was less than 1.7 GPa was evaluated as "no-good", the case where value of the elastic modulus was 1.7 GPa or more and less than 2.0 GPa was evaluated as "normal", and the case where the value of the elastic modulus was 2.0 GPa or more was evaluated as "good". The elastic modulus of the aforementioned specimen was 2.1 GPa, and the evaluation of the specimen was "good".

(Falling Impact Strength of Cellulose Composite Resin Molded Article)

A falling impact test was performed using the obtained plate-shaped specimen. Specifically, a weight weighing 250 g was allowed to fall from a height of 80 cm against the plate surface of the specimen, and it was examined whether or not the specimen cracked. The evaluation method of the falling impact test was such that the case where no crack(s) was found was evaluated as "good", the case where a crack(s) was found only on the surface and the length of the crack was less than 10 mm was evaluated as "normal", and the case where a penetrating crack(s) was found or the length of the crack was 10 mm or more was evaluated as "no-good". The aforementioned specimen was free from cracks, and the evaluation thereof was "good".

(Color Difference L Value (Brightness Index Value) of Cellulose Composite Resin)

The L value (brightness index value) of a specimen with a No. 1 dumbbell shape was measured using a color difference meter (Chroma Meter CR-400, manufactured by KONICA MINOLTA JAPAN, INC.). The evaluation method of color-difference L value was such that the case where the numerical value thereof was less than 50 was evaluated as "no-good", and the case where the numerical value was 50 or more was evaluated as "good". The specimen had an L value of 60, and the evaluation result thereof was "good".

(Crystallinity of Cellulose Composite Resin)

A crystallization peak was measured by Differential Scanning calorimetry (DSC) measurement, and the peak area thereof was integrated. It is confirmed that there is a correlation between the value of the crystallinity obtained from the measurement of X-ray Diffraction (XRD) and the crystallization peak area obtained by DSC measurement. The evaluation method of the crystallinity was such that when the value of the crystallinity of only the base resin is 1, the case where the value is 1.5 or more is evaluated as "no-good", and the case where the value is less than 1.5 is evaluated as "good". The cellulose composite resin had a value of 1.4, and the evaluation thereof was "good".

(Degree of Aggregation of Fibrous Filler)

Using the obtained plate-shaped specimen, the number and the size of the aggregates of the fibrous filler were observed with an optical microscope. The evaluation method of the degree of aggregation was such that the case where there were 10 or more aggregates with a size of 1000 μm or more existing in a 10 mm square area was evaluated as "no-good", the case where there were 3 or more and less than 10 aggregates was evaluated as "normal", and the case where there were less than 3 aggregates was evaluated as "good". The number of aggregates with a size of 1000 μm in the specimen was 2, and the evaluation thereof was "good".

(Molecular weight)

The molecular weight of a cellulose composite resin pellet was measured. When the average molecular weight of the cellulose composite resin pellet was larger than 20% compared with the raw material of the pellet, it was evaluated as "no-good", and when the average molecular weight was 20% or less, it is evaluated as "good". The pellet was evaluated as "good".

Example 2

In example 2, the amounts of the cellulose fiber and the dispersing agent were increased, and the weight ratio of the base resin:the cellulose fiber:the dispersing agent:the rubber-containing polymer was changed to 65.5:20:6.5:8. While the other conditions were made the same as those in example 1, cellulose composite resin pellets and a molded article were produced. The same evaluations as those in example 1 were performed.

Example 3

In example 3, the amount of the dispersing agent was increased as compared to example 1, and the weight ratio of the base resin:the cellulose fiber:the dispersing agent:the rubber-containing polymer was changed to 70:15:7:8. While the other material conditions and process conditions were made the same as those in example 1, cellulose composite resin pellets and a molded article were produced. The same evaluations as those in example 1 were performed.

Example 4

In example 4, the amount of the rubber-containing polymer was increased as compared to example 1, and the weight ratio of the base resin:the cellulose fiber:the dispersing agent:the rubber-containing polymer was changed to 68:15:5:12. While the other material conditions and process conditions were made the same as those in example 1, cellulose composite resin pellets and a molded article were produced. The same evaluations as those in example 1 were performed.

Example 5

In example 5, the system was changed to one where the first mixture obtained by dry-blending the base resin, the cellulose fiber, and the dispersing agent was supplied from a main feeder and the rubber-containing polymer was side-fed. That is, the rubber-containing polymer was kneaded with the first mixture to form a second mixture. While the other material conditions and process conditions were made the same as those in example 1, cellulose composite resin pellets and a molded article were produced. The same evaluations as those in example 1 were performed.

Comparative Example 1

In comparative example 1, while a cellulose fiber with an α-cellulose content of 30% was used and the other material conditions and process conditions were made the same as those in example 1, cellulose composite resin pellets and a molded article were produced. The same evaluations as those in example 1 were performed.

Comparative Example 2

In comparative example 2, while a cellulose fiber with an α-cellulose content of 90% was used and the other material conditions and process conditions were made the same as those in example 1, cellulose composite resin pellets and a molded article were produced. The same evaluations as those in example 1 were performed.

Comparative Example 3

In comparative example 3, the amount of the cellulose fiber was reduced as compared to example 1, and the weight ratio of the base resin:the cellulose fiber:the dispersing agent:the rubber-containing polymer was changed to 90.5:1:0.5:8. While the other material conditions and process conditions were made the same as those in example 1, cellulose composite resin pellets and a molded article were produced. The same evaluations as those in example 1 were performed.

Comparative Example 4

In comparative example 4, the amount of the cellulose fiber was increased as compared to example 1, and the weight ratio of the base resin:the cellulose fiber:the dispersing agent:the rubber-containing polymer was changed to 22:60:10:8. While the other material conditions and process conditions were made the same as those in example 1, cellulose composite resin pellets and a molded article were produced. The same evaluations as those in example 1 were performed.

Comparative Example 5

In comparative example 5, the amount of the dispersing agent was reduced as compared to example 1, and the weight ratio of the base resin:the cellulose fiber:the dispersing agent:the rubber-containing polymer was changed to 76.99:15:0.01:8. While the other material conditions and process conditions were made the same as those in example 1, cellulose composite resin pellets and a molded article were produced. The same evaluations as those in example 1 were performed.

Comparative Example 6

In comparative example 6, the amount of the dispersing agent was increased as compared to example 1, and the weight ratio of the base resin:the cellulose fiber:the dispersing agent:the rubber-containing polymer was changed to 47:15:30:8. While the other material conditions and process conditions were made the same as those in example 1, cellulose composite resin pellets and a molded article were produced. The same evaluations as those in example 1 were performed.

Comparative Example 7

In comparative example 7, the amount of the rubber-containing polymer was reduced as compared to example 1, and the weight ratio of the base resin:the cellulose fiber:the dispersing agent:the rubber-containing polymer was changed to 79.5:15:5:0.5. While the other material conditions and process conditions were made the same as those in example 1, cellulose composite resin pellets and a molded article were produced. The same evaluations as those in example 1 were performed.

Comparative Example 8

In comparative example 8, the amount of the rubber-containing polymer was reduced as compared to example 1, and the weight ratio of the base resin:the cellulose fiber:the dispersing agent:the rubber-containing polymer was changed to 50:15:5:30. While the other material conditions and process conditions were made the same as those in example 1, cellulose composite resin pellets and a molded article were produced. The same evaluations as those in example 1 were performed.

The measurement results in each of examples 1 to 5 and comparative examples 1 to 8 are shown in the table of FIG. 3.

In example 2, in which the amount of the cellulose fiber was increased, the fiber reinforcing effect exerted by the cellulose fiber increases as compared to example 1, so that the elastic modulus was 2.3 GPa. In example 3, in which the amount of the dispersing agent was increased, adhesion between the cellulose fiber and the base resin or the rubber-containing polymer is improved as compared to example 1 by increasing the dispersing agent, so that the elastic modulus was 2.2 GPa. In addition, the impact strength was evaluated as "good" at 90 cm. In example 4, in which the rubber-containing polymer was increased, the impact strength reinforcing effect by the rubber-containing polymer functions more effectively than in example 1, so that the impact strength was increased and no crack occurred even at 100 cm. In example 5, compared with example 1, the system was changed to one in which the base resin, the cellulose fiber, and the dispersing agent were fed from the main feeder and the rubber-containing polymer was fed from the side feeder, and they were then kneaded together. Then, in example 5, a larger shear stress was applied to materials until the rubber-containing polymer was fed from the side feeder as compared with example 1, in which all raw materials were fed simultaneously and then kneaded. In the case where all raw materials were simultaneously fed, the energy of a shear stress is absorbed by a soft rubber-containing polymer, so that the energy applied to the other raw materials is reduced. Therefore, in example 5, the dispersion of the raw materials and the defibration of the cellulose fiber proceeded, so that the elastic modulus and the impact strength were improved. As described above, examples 2, 3, 4, and 5 afforded results equivalent or superior to those of example 1 in all the tests.

In comparative example 1, in which the cellulose fiber having an α-cellulose content of 30% by mass was used, since a large amount of components low in thermal stability was present in the cellulose fiber, thermal decomposition of the cellulose fiber was caused due to shear heat generation. Therefore, the cellulose composite resin was colored to have a lowered L value, and the evaluation result thereof was "no-good".

In comparative example 2, in which a cellulose fiber having an α-cellulose content of 90% by mass was used, α-cellulose, which is high in crystallinity, was contained in an amount of 90% by mass in the cellulose fiber and the crystallinity of the base resin was increased, so that the noncrystalline portion of the base resin decreased and the impact strength reinforcing effect by the rubber-containing polymer also decreased. As a result, the impact strength lowered to cause cracking in the falling impact test.

In comparative example 3, in which the weight ratio of the cellulose fiber to the whole raw material was made small, since the amount of the cellulose fiber was small, the viscosity was lowered, so that the dispersion of the raw materials and the defibration of the cellulose fiber did not proceed and the evaluation result of the specific surface area of the cellulose fiber was "normal". In addition, since the amount of the cellulose fiber was excessively small, improvement in mechanical properties of the cellulose composite resin due to the fiber reinforcing effect was not exhibited, resulting in a decrease in elastic modulus to 1.4 GPa.

In comparative example 4, in which the weight ratio of the cellulose fiber to the whole raw material was made large, since the amount of the cellulose fiber was large, the viscosity became excessively high, so that a large shear stress was applied on the raw material, causing deterioration of the raw material. As a result, the molecular weight of the base resin significantly decreased, and the evaluation result thereof was "no-good". In addition, since the amount of the cellulose fiber was excessively large, the impact strength was lowered to cause cracking in the falling impact test.

In comparative example 5, the weight ratio of the dispersing agent to the whole raw material was made small. Then, a sufficient amount of the dispersing agent was not present at the interface between the cellulose fiber and the base resin due to the excessively small amount of the dispersing agent. As a result, voids, etc. were formed at the interface and the improvement in mechanical properties of the cellulose composite resin due to the fiber reinforcing effect decreased, resulting in a decrease in elastic modulus to 1.8 GPa. In addition, since the amount of the dispersing agent was small, aggregation of the cellulose fiber increased. As a result, cracks were likely to be formed starting from the void portions or the aggregates of the cellulose fiber at the time of a falling impact test, so that the impact strength was lowered to cause cracking in the falling impact test.

In comparative example 6, in which the weight ratio of the dispersing agent to the whole raw materials was made large, since the dispersing agent was present excessively, the elastic modulus of the cellulose composite resin decreased to 1.6 GPa.

In comparative example 7, in which the weight ratio of the rubber-containing polymer to the whole raw material was made small, a sufficient impact strength reinforcing effect was not exhibited due to the excessively small amount of the rubber-containing polymer, so that the impact strength decreased to cause cracking in the falling impact test.

In comparative example 8, in which the weight ratio of the rubber-containing polymer to the whole raw material was made large, since the amount of the rubber-containing polymer, which was low in elastic modulus, was excessively large, the elastic modulus of the entire cellulose composite resin decreased to 1.4 GPa.

From the above-described evaluations, when the amounts of the cellulose fiber, the dispersing agent, and the rubber-containing polymer were made excessively large or excessively small, elastic modulus or impact strength significantly lowered. Moreover, when the α-cellulose content in a cellulose fiber was made excessively high, impact strength significantly lowered. On the other hand, when the α-cellulose content in a cellulose fiber was made excessively low, coloring caused by thermal decomposition was significant, so that a problem occurred with colorability. However, when the α-cellulose content in a cellulose fiber is made 50% by mass or more and less than 80% by mass, the effects of the respective components are appropriately expressed and combined, so that a cellulose composite resin having a high mechanical strength and good colorability can be produced. From the above, it was revealed that by using a cellulose fiber with an α-cellulose content of 50% by mass or more and less than 80% by mass and bringing the weight ratio of the raw materials into a prescribed range, the effects of the respective materials are appropriately exhibited without offsetting each other. Then, the resulting cellulose composite resin is high in L value and good in colorability and has a high elastic modulus and a high impact property.

The present disclosure includes appropriately combining arbitrary embodiments and/or examples of the various embodiments and/or examples described above, and the effects of the respective embodiments and/or examples can be produced.

The cellulose composite resin according to the present disclosure is superior in mechanical strength to conventional general purpose resins and can provide a molded article superior in colorability. Since the cellulose composite resin according to the present disclosure can improve the properties of the base resin, it can be used as a substitute for engineering plastics or as a substitute for metallic materials. Therefore, it can significantly reduce the manufacturing cost of various industrial products made of engineering plastic or metal, or of living goods. Furthermore, it can be used for consumer electronics casings, construction materials, and automobile components.

DESCRIPTION OF REFERENCE SIGNS

1 Base resin
2 Cellulose fiber
3 Dispersing agent
4 Rubber-containing polymer
11 Noncrystalline portion
12 Crystalline portion

What is claimed is:

1. A method for producing a cellulose composite resin, comprising:

preparing a first mixture of a base resin, a cellulose fiber, and a dispersing agent, and adding a rubber-containing polymer to the first mixture and kneading a second mixture, wherein a time of preparing the first mixture is 0.1 times or more a time of adding the rubber-containing polymer and kneading the second mixture.

2. The method for producing a cellulose composite resin according to claim 1, wherein an α-cellulose content in the cellulose fiber is 50% by mass or more and less than 80% by mass.

3. The method for producing a cellulose composite resin according to claim 1, wherein a content of the cellulose fiber is 5% by mass or more and 25% by mass or less where a total amount of the base resin, the cellulose fiber, the dispersing agent, and the rubber-containing polymer in the cellulose composite resin is 100% by mass.

4. The method for producing a cellulose composite resin according to claim 1, wherein a content of the dispersing agent is 0.1% by mass or more and 15% by mass or less where a total amount of the base resin, the cellulose fiber, the dispersing agent, and the rubber-containing polymer in the cellulose composite resin is 100% by mass.

5. The method for producing a cellulose composite resin according to claim 1, wherein a content of the rubber-containing polymer is 1% by mass or more and 20% by mass or less where a total amount of the base resin, the cellulose fiber, the dispersing agent, and the rubber-containing polymer in the cellulose composite resin is 100% by mass.

6. The method for producing a cellulose composite resin according to claim 1, wherein the rubber-containing polymer is a rubber-containing polymer that is composed of an aliphatic hydrocarbon or aromatic hydrocarbon having only a functional group composed of atoms having a Pauling's electronegativity of 2.7 or less and having a structure where a difference in electronegativity between adjacent atoms is 0.8 or less.

7. The method for producing a cellulose composite resin according to claim 1, further comprising a colorant.

8. The method for producing a cellulose composite resin according to claim 1, wherein the base resin is an olefin-based resin.

9. The method for producing a cellulose composite resin according to claim 1, wherein the first mixture is supplied from a main feeder, and the rubber-containing polymer is side-fed to the first mixture.

* * * * *